United States Patent [19]

Veatch

[11] 4,152,690
[45] May 1, 1979

[54] FLEXIBLE TRANSDUCER MOUNT

[76] Inventor: Don W. Veatch, P.O. Box 207, Longview, Tex. 75601

[21] Appl. No.: 853,099

[22] Filed: Nov. 21, 1977

[51] Int. Cl.² .............................................. H04R 1/34
[52] U.S. Cl. ..................................... 340/8 S; 248/278
[58] Field of Search ................ 340/8 S; 248/278, 291, 248/4

[56] References Cited

U.S. PATENT DOCUMENTS

| 2,671,206 | 3/1954 | Krause | 340/8 S |
| 2,947,856 | 8/1960 | Fox | 248/278 |
| 3,880,106 | 4/1975 | Farmer | 340/8 S |
| 3,989,216 | 11/1976 | Veatch | 248/278 |

Primary Examiner—Richard A. Farley
Attorney, Agent, or Firm—Wofford, Fails & Zobal

[57] ABSTRACT

Apparatus for mounting an acoustic transducer in connection with a boat to allow the transducer to be moved about beneath the water and thereby scan more than one direction. The apparatus comprises a flexible control cable with a device which actuates it fastened to the cable's upper end. Fastened to its lower end is a pivot mechanism which converts the action of the control cable to a pivotal movement. This pivot mechanism holds a transducer support mount such that the action of the control cable pivots the transducer support mount; preferably, in a vertical plane. The pivot mechanism is connected with the boat such that the pivot mechanism and the transducer it holds are held beneath the water; and, preferably, such that the transducer mount can be rotated 360° about the vertical axis, as in a substantially horizontal plane.

5 Claims, 9 Drawing Figures

U.S. Patent  May 1, 1979  Sheet 2 of 2  4,152,690
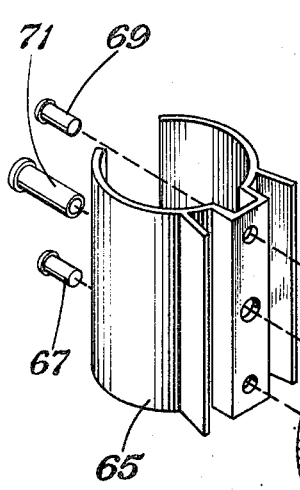
Fig. 5
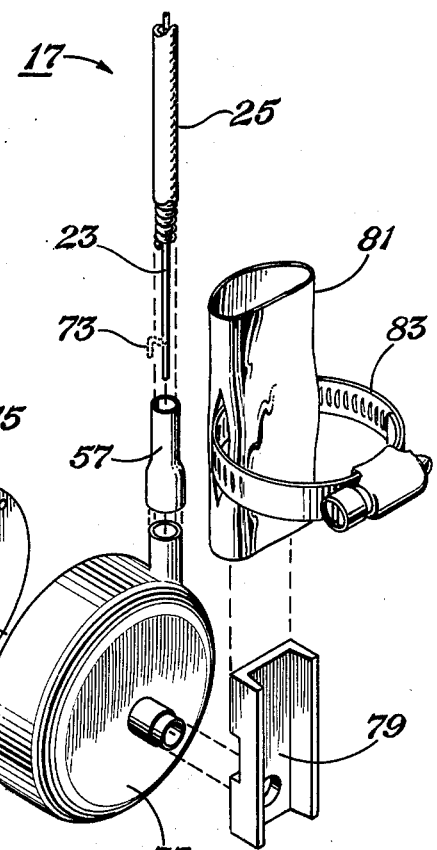
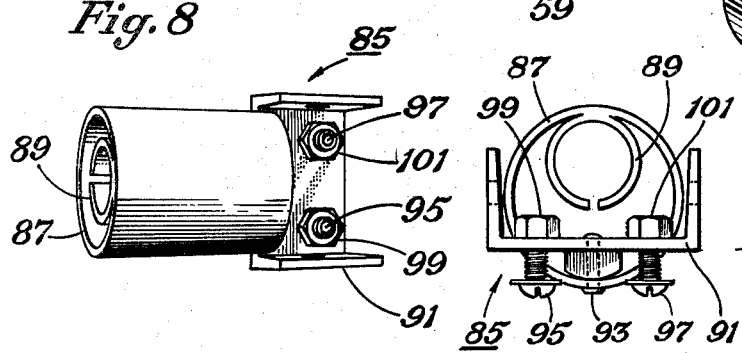
Fig. 8   Fig. 9
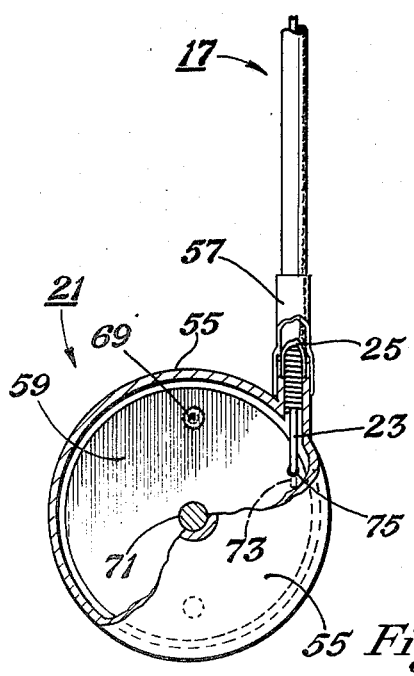
Fig. 7
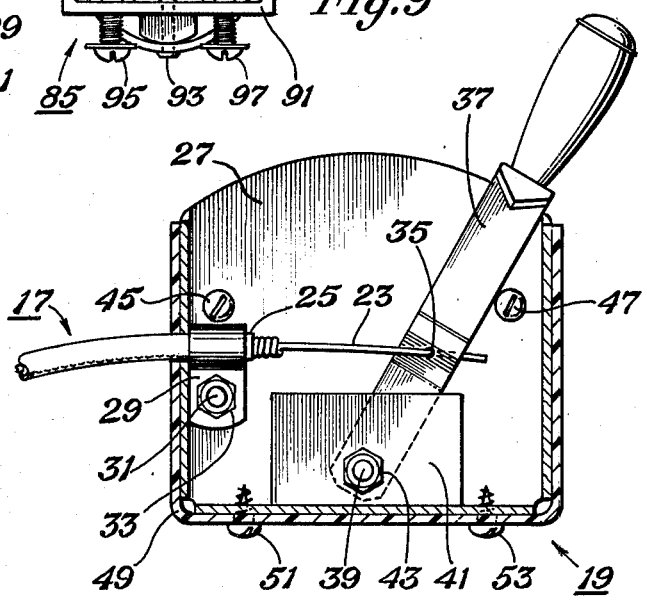
Fig. 6

FLEXIBLE TRANSDUCER MOUNT

BACKGROUND OF THE INVENTION

1. Field of the Invention

This invention relates to a transducer mounting apparatus for a boat and more particularly to an apparatus for mounting an acoustic transducer to a boat which allows the acoustic transducer to be pointed in more than one direction.

2. Description of the Prior Art

Currently, electronic sonar systems are being used extensively by fisherman and boatmen. These systems include an acoustic transmitting and receiving transducer located in the water and monitoring or display instrumentation located in the boat. Various brackets are currently in use for mounting the transducer to the boat. Most of the known brackets mount the transducer in a fixed position or are adjustable only by removal of the bracket from the water. The closest prior art of which I am aware is my earlier issued patent, U.S. Pat. No. 3,989,216; entitled "Transducer Mounting Bracket", issued Nov. 2, 1976; and the descriptive matter of that patent is incorporated herein by reference for details omitted herefrom. The bracket in U.S. Pat. No. 3,989,216 allows the transducer to be pointed in various directions by operations from within the boat. The bracket of U.S. Pat. No. 3,989,216 comprises a control rod within a support shaft with a control at its upper end and a pivoting device for the transducer at its lower end. The upper end of the shaft is attached to the boat by a universal coupling device which positions the axis of the shaft vertically regardless of the attitude of the boat. The patented bracket is a high quality, relatively expensive piece of equipment.

From the foregoing, it can be seen that the prior art has not provided a totally satisfactory simple, economical, and versatile transducer mount that allows pointing the transducer in various directions underwater.

SUMMARY OF THE INVENTION

It is an object of the present invention to provide a simple, economical, and versatile apparatus for mounting an acoustic transducer to a boat and pointing that transducer in various directions beneath the water via a control from within the boat.

This and other objects will be apparent from the following descriptive matter; particularly when taken in conjunction with the appended drawings. The apparatus of the present invention includes a plurality of elements. It includes a flexible control cable comprising a wire in a flexible sheath with means for operating the control cable fastened to the cable's upper end. By "operating the control cable" is meant creating relative movement between the wire and the sheath. Fastened to the lower end of the control cable is a conversion means for converting the operation of the control cable to a pivotal movement. This conversion means holds a transducer support mount in a pivotal relation such that the operation of the control cable pivots the transducer support mount. Means for holding the conversion means beneath the water connects the boat with the conversion means and thereby holds the transducer support mount beneath the water. In a particular aspect, where the boat is equipped with a trolling motor, the conversion means is fastened to the shaft of the trolling motor such that the transducer support mount is held beneath the water and pivots about an axis transverse to the rotational axis of the trolling motor.

The apparatus of the present invention is versatile, since it can be used in at least two ways. In one method of its use, the conversion means is held in a fixed position by the holding means and the transducer support mount pivots about only one axis. In this use, the transducer can easily be placed in a position where it does not obstruct the boat user or fisherman since the flexible control cable allows almost universal positioning of both the transducer support mount and the means for controlling it. In another method of use, where the boat is equipped with a horizontal rotational means, such as a trolling motor, the transducer pivots about two transverse axes. In this method of use, since one axis is horizontal and the other vertical the transducer support mount can pivot to point in all directions beneath the water.

The apparatus of the present invention is also simple and economical in that it contains relatively few parts and is able to be packaged for sale in a compact arrangement.

BRIEF DESCRIPTION OF DRAWINGS

FIG. 5 is an exploded view of the pivot mechanism and its support structure.

FIG. 6 is an elevational view, partly in section, of the control lever box with the front of the box cut away to show the inside.

FIG. 7 is a view of the pivot mechanism and control cable with part of the cylinder and cable sheath cut away to show its operation.

FIG. 8 is an isometric view of the transducer mount adapter.

FIG. 9 is an end view of the transducer mount adapter.

DESCRIPTION OF PREFERRED EMBODIMENTS

Figure 1:
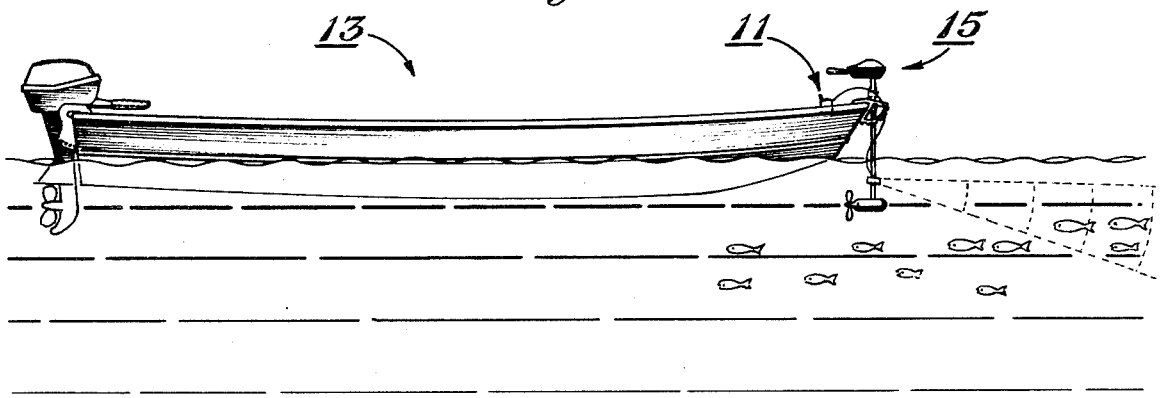
FIG. 1 is a side elevational view of a boat and a trolling motor with the transducer mounting apparatus attached.
Figure 2:
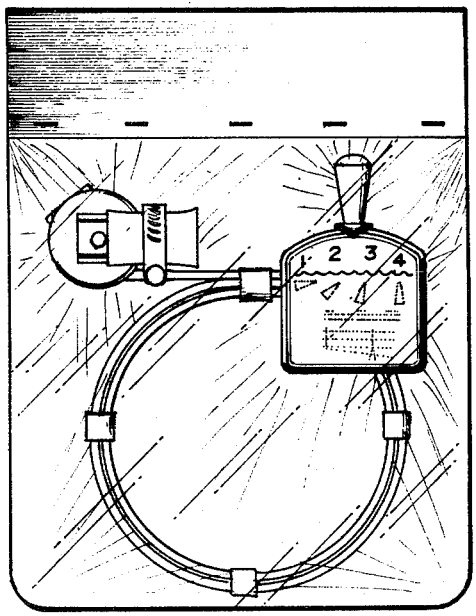
FIG. 2 is a front elevational view that shows the transducer mounting apparatus packaged for sale.
Figure 3:
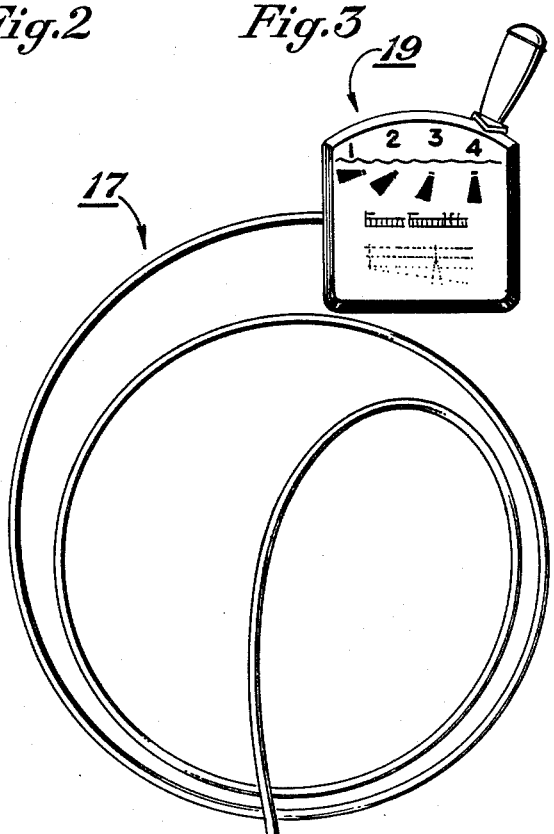
FIG. 3 is an overall elevational view of the apparatus of the present invention.

Referring now to FIG. 1, the transducer mounting apparatus of the present invention is shown at 11. It is attached to a boat 13 and its trolling motor 15. FIG. 2 shows the apparatus packaged for sale. As seen in FIG. 3, the apparatus is comprised of a flexible control cable 17, a control lever box 19 and a pivot mechanism 21. The control lever box 19 actuates the control cable 17 and thereby causes pivoting in the pivot mechanism 21. A description of these elements and their operation follows.

Referring now to FIGS. 3, 5, 6 and 7, the flexible control cable 17 is comprised of a wire 23 located inside a sheath 25 of helically bent wire covered by plastic. Wire 23 is free to slide within sheath 25 and this motion of wire 23 with respect to sheath 25 allows the control lever box 19 to operate the pivot mechanism 21.

Figure 4:
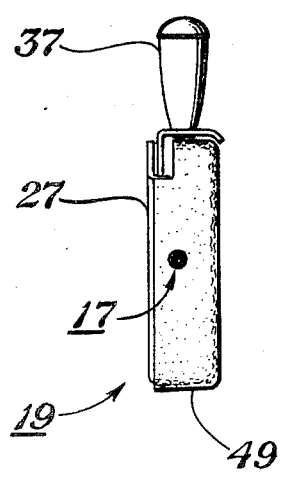
FIG. 4 is a side view of the control lever box.

Referring to FIGS. 4 and 6, the top end of the control cable 17 is attached to the control lever box 19. The sheath 25 is held fixed to a back plate 27 by a clamp 29. The clamp 29 pinchingly engages the sheath 25 and is held to the back plate 27 by a bolt 31 and a nut 33. The top end of wire 23 bends through a hold 35 in a lever arm 37 such that the wire 23 can pivot in the hole 35 but is otherwise held fixed to the lever arm 37. The lever arm 37 pivots about a bolt 39. This bolt 39 engages both a rectangular shaped plate 41 and the back plate 27. The bolt 39 is held in this position by a nut 43. Mounting screws 45 and 47 fasten the control lever box in position inside the boat. A front cover 49 fits over the back plate 27 and is held in place by screws 51 and 53. From the foregoing description it can be seen that as the lever arm 37 is pivoted about the bolt 39 it thereby moves the wire 23 with respect to the sheath 25.

Referring now to FIGS. 5 and 7, attached to the bottom of control cable 17 is the pivot mechanism 21. The main body of the pivot mechanism is a shallow, half-closed metal cylinder 55. Two tubular passages extend from the cylinder 55; one outwardly from the axis of the cylinder, and one near tangentially from the perimeter of the cylinder. The tubular passage which extends from the perimeter of cylinder 55 clamps to engage the sheath 25. A sleeve 57 covers the connection between the sheath 25 and the cylinder 55. The pivoting part of the pivot mechanism is comprised of three discs 59, 61, 63 and a channel shaped holder 65. The two smaller discs, 59 and 61, fit inside the cylinder 55 and disc 63 covers the open end of cylinder 55. The holder 65 is seated on top of disc 63. All three discs 59, 61, 63 and the holder 65 are riveted together by rivets 67 and 69. A third rivet 71 extends through the holder 65, the three discs 59, 61, 63, and the tubular passage at the axis of cylinder 55 such that the entire pivoting part is free to pivot with respect to the cylinder 55. A bend 73 in the wire 23 engages the disc 59 through a hole 75. A notch 77 in disc 61 allows the wire 23 to pivot in the hole 75. From the foregoing description it can be seen that as wire 23 moves with respect to sheath 25, it causes the discs 59, 61, 63 and the holder 65 to pivot about rivet 71.

Referring to FIG. 5, a channel shaped support beam 79 fits over the axially extending tubular passage of the cylinder 55 and is held rigidly in place by the expanded tubular passage. A plastic sleeve 81 fits over the support beam 79. An O-clamp 83 passes through sleeve 81 and is held in position behind the support beam 79. The entire structure of the support beam 79, the sleeve 81, and the O-clamp 83 is provided to hold the pivot mechanism 21 in connection with the boat. In one application the O-clamp 83 is clamped around the shaft of a trolling motor such that the holder 65 pivots about an axis transverse to the rotational axis of the trolling motor. This enables a transducer held by the holder 65 to be pointed in any direction beneath the water. In another application the O-clamp is clamped about a rigid member which extends downward from the boat into the water. This allows pivoting of a transducer only about one axis unless adjustment is made to the O-clamp but it eliminates the necessity of the trolling motor.

Referring now to FIGS. 8 and 9, a transducer mount adapter is illustrated at 85. It is comprised of a larger cylinder 87, a smaller cylinder 89, and a channel-shaped metal bar 91. The smaller cylinder 89 is glued to the inside of the larger cylinder 87. A split along the perimeter of the smaller cylinder 89 is located opposite its glued perimeter. The channel-shaped bar 91 is attached to the inside perimeter of the larger cylinder 87 opposite the smaller cylinder 89. The bar 91 is held in place by a rivet 93. Two bolts 95 and 97 extend through the bottom of the channel of bar 91. The bolts 95 and 97 are held in place by nuts 99 and 101. The transducer mount adapter 85 is provided to allow transducers of various types to be mounted into the holder 65. The transducer is engaged by the bolts 95 and 97 or screwed into the smaller cylinder 89 and then the larger cylinder 87 is fitted into the holder 65. The holder 65 is made of a flexible plastic and therefore is able to resiliently return to hold the larger cylinder 87 in place. Some transducers are shaped such that they fit into the holder 65 without use of the transducer mounting adapter 85 in which case it is not used.

From the foregoing description it can be seen that by pivoting the lever arm 37, the cable 17 is actuated; which, in turn, pivots the holder 65 and hence a transducer. In order for a person operating the lever arm to know which direction the transducer is pointing an illustration is provided on the front cover 49. As shown in FIG. 3, four positions are illustrated. The first position indicates a horizontal pointing, the fourth position indicates a downward pointing, and the second and third positions indicate pointings in between the horizontal and downward. The lever arm 37 has a pointer located above the illustrated positions on the front cover 49. When the pivot mechanism is mounted properly in connection with the boat, this pointer indicates to the operator the actual pointed direction of the transducer beneath the water.

In operation on a boat this apparatus serves to aid the boatman or fisherman in the use of a transducer and an accompanying display scope which interprets soundings made by the transducer. As previously described, the transducer is held by either the transducer mount adapter 85 or the holder 65, depending on the model of transducer used. The transducer emits a cone of acoustic waves and then receives the waves after they are reflected from a solid body. The display scope interprets the variations in the reflected waves to allow a user to read both the distance of the solid body from the transducer and its position in the emitted cone. Thus, a user of the transducer and display scope can locate fish, find the depth of the water, locate channels or sunken objects, and generally determine the location of solid bodies beneath the water. The apparatus of the present invention aids the user of a transducer in pointing the cone of emitted waves where the user desires by means of a control from within the boat.

Thus, from the foregoing description, it can be seen that the mounting bracket can be used in the following manner. With the transducer properly in the holder 65 the lever can be placed in position 1 for scanning near the surface; for example, to discover and avoid debris endangering the travel of the boat. The lever can be placed in position 2 for scanning deeper, such as for locating fish. With the lever in position 3, the transducer is pointed even more vertically to scan, for example, for channels on the bottom of a lake. Position 4 points the transducer vertically, for such uses as depth finding.

The foregoing disclosure and the showings made in the drawings are merely illustrative of the principles of this invention and are not to be interpreted in a limiting sense.

What is claimed is:

1. Apparatus for mounting and pivoting an acoustic transducer beneath the water for use with a boat equipped with a trolling motor, which comprises:

a. a flexible control cable comprising a wire inside a sheath;

b. motive means for moving said wire with respect to said sheath fastened to the upper end of said control cable;
c. a transducer support mount;
d. conversion means for converting the motion of said wire with respect to said sheath to a pivotal movement of said transducer support mount; said conversion means being fastened to the lower end of said control cable and holding said transducer support mount in a pivotal relation such that the motion of said wire with respect to said sheath pivots said transducer support mount; and
e. means for fastening said conversion means to the shaft of the trolling motor such that said transducer support mount is held beneath the water above and to the side of the trolling motor such that said transducer support mount pivots about an axis transverse to the rotational axis of the trolling motor.

2. The apparatus of claim 1 wherein the conversion means comprises:
a. a housing; and
b. a disc mounted for rotation with respect to said housing; said sheath of said cable being fastened to said housing and said wire of said cable being attached to the rim of said disc such that motion of said wire with respect to said sheath causes said disc to rotate; said transducer support mount being attached to the outer face of said disc.

3. Apparatus for mounting and pivoting an acoustic transducer beneath the water for use with a boat, which comprises:
a. a flexible control cable comprising a wire inside a sheath;
b. motive means for moving said wire with respect to said sheath fastened to the upper end of said control cable;
c. a transducer support mount;
d. a pivot mechanism housing;
e. a disc mounted for rotation with respect to said pivot mechanism housing; said sheath of said cable being fastened to said pivot mechanism housing, and said wire of said cable being attached to the rim of said disc such that motion of said wire with respect to said sheath causes said disc to rotate; said transducer support mount being attached to the outer face of said disc.
f. holding means attached to said pivot mechanism housing for holding said pivot mechanism housing and thereby said transducer support mount beneath the water; said holding means being able to be connected with the boat.

4. The apparatus of claim 3 wherein the holding means comprises a shaft mounting means for fastening said pivot mechanism housing to the shaft of a trolling motor such that said transducer support mount is held beneath the water above and to the side of the trolling motor.

5. The apparatus of claim 4 which further comprises an adapter for holding various types of transducers; said adapter comprising a split walled plastic cylinder sized for receiving small, cylindrical transducers; a cylindrical housing which removably fits into said transducer support mount, said split walled cylinder attached to the inner wall of said cylindrical housing; and a channel shaped member for receiving odd shaped transducers, said channel shaped member being attached to one end of said cylindrical housing; said cylindrical housing being connected with said transducer support mount.

* * * * *